US008874152B2

(12) United States Patent
Sun et al.

(10) Patent No.: US 8,874,152 B2
(45) Date of Patent: Oct. 28, 2014

(54) WIRELESS COMMUNICATION SYSTEM, COEXISTENCE MANAGER INSTALLED IN SAID SYSTEM, AND METHOD FOR WIRELESS COMMUNICATION

(75) Inventors: Chen Sun, Koganei (JP); Ha Nguyen Tran, Koganei (JP); Yohannes Alemseged Demessie, Koganei (JP); Hiroshi Harada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 250 days.

(21) Appl. No.: 13/580,379

(22) PCT Filed: Feb. 22, 2011

(86) PCT No.: PCT/JP2011/000996
§ 371 (c)(1),
(2), (4) Date: Aug. 22, 2012

(87) PCT Pub. No.: WO2011/105059
PCT Pub. Date: Sep. 1, 2011

(65) Prior Publication Data
US 2012/0322476 A1 Dec. 20, 2012

(30) Foreign Application Priority Data
Feb. 23, 2010 (JP) .................. 2010-038021

(51) Int. Cl.
*H04B 15/00* (2006.01)
*H04W 16/14* (2009.01)
*H04W 72/08* (2009.01)

(52) U.S. Cl.
CPC ............ *H04W 16/14* (2013.01); *H04W 72/082* (2013.01)
USPC ......... 455/501; 455/454; 455/509; 370/241.1

(58) Field of Classification Search
CPC ..... H04W 72/04; H04W 24/02; H04W 16/14; H04W 88/06; H04W 48/18; H04W 72/082; H04W 72/0493; H04W 72/1215; H04W 88/10; H04W 72/00; H04W 72/08; H04W 24/10; H04W 72/02; H04W 72/1278; H04W 28/16; H04W 52/243; H04W 72/0406; H04W 40/16; H04W 72/1257; H04B 17/00; H04B 17/006; H04B 17/0067; H04B 1/0475; H04B 7/0632; H04L 1/0026; H04L 5/0073; H04L 5/0039; H04L 5/006; H04L 5/0062
USPC ................ 455/501, 509, 450, 464, 454, 63.1; 370/336, 329, 241.1, 281, 231
See application file for complete search history.

(56) References Cited

U.S. PATENT DOCUMENTS

| 8,379,586 B2 * | 2/2013 | Kasslin et al. ................. 370/329 |
| 8,615,250 B2 * | 12/2013 | Xing ............................. 455/454 |
| 2008/0259859 A1 * | 10/2008 | Cordeiro et al. ............... 370/329 |
| 2013/0235814 A1 * | 9/2013 | Wietfeldt et al. .............. 370/329 |
| 2014/0038657 A1 * | 2/2014 | Jo et al. ......................... 455/509 |

FOREIGN PATENT DOCUMENTS

| JP | 2007-184850 A | 7/2007 |
| JP | 2007-300419 A | 11/2007 |
| JP | WO2008129716 A1 | 10/2008 |
| JP | 2008-306663 A | 12/2008 |

OTHER PUBLICATIONS

International Search Report for PCT/JP2011/000996 from the Japanese Patent Office completed on Mar. 24, 2011 and mailed Apr. 5, 2011 (4 pages).
Second Report and Order and Memorandum Opinion and Order FCC 08-260 ET Released Nov. 14, 2008.

* cited by examiner

*Primary Examiner* — Sujatha Sharma
(74) *Attorney, Agent, or Firm* — Pyprus Pte Ltd

(57) ABSTRACT

Disclosed is a wireless communication system capable of avoiding interference even when a network including a secondary user coexists. The wireless communication system includes a primary user belonging to a first network, a first secondary user belonging to a second network, and a coexistence manager (CM). The coexistence manager (CM) acquires information relating to spectrum holes that are, at least temporarily, not in use by the primary user. In addition, the coexistence manager (CM) determines whether or not usage of the spectrum holes by the first secondary user causes interference. If the determination result is that interference is caused, coexistence manager (CM) notifies to this effect a second secondary user belonging to a third network, which differs from the second network.

14 Claims, 5 Drawing Sheets

WIRELESS COMMUNICATION SYSTEM, COEXISTENCE MANAGER INSTALLED IN SAID SYSTEM, AND METHOD FOR WIRELESS COMMUNICATION

TECHNICAL FIELD

The present invention relates to a wireless communication system, a coexistence manager installed in the system, and a wireless communication method and, more particularly, to a wireless communication system including a plurality of networks, a coexistence manager installed in the system, a wireless communication method, and the like.

BACKGROUND ART

In a wireless communication system, by allocating a frequency to a communication device, communication (communication service) of the communication device is enabled. However, at present, it is difficult to allocate frequencies to latest applications and services. The reason is that since predetermined frequency bands are already allocated to various services by a regulatory organization or the like, the spectrum is in a saturation state. In contrast to the saturation state, in reality, there is a frequency band which is not occupied by the spectrum and a load actually applied to the spectrum is not so heavy.

The federal communications commission (FCC) publicly announced a document prepared by the spectrum policy task force (SPTF) in 2002. The document relates to efficient use of the radio spectrum. Concretely, by allowing unlicensed wireless service to an access to a spectrum which is not occupied as described above, efficient use of the radio spectrum is enabled.

One of radio techniques using an unoccupied spectrum is the cognitive radio technique. In a cognitive radio communication system using the cognitive radio technique, first, a secondary user specifies a spectrum which is not temporarily used by a primary user. The primary user is a user licensed to use the spectrum. Subsequently, the secondary user starts communication using the specified radio spectrum. In such a manner, efficient use of the radio spectrum is enabled.

However, in the case where a plurality of secondary users exists, there is a problem such that when the secondary users specify the spectrum and start communication, interference occurs among the plurality of secondary users. Particularly, in the case where a plurality of secondary users belong to networks different from one another or in the case where a plurality of secondary users use communication protocols different from one another, the above-described problem becomes conspicuous.

To solve the above-described problem, for example, a standardization group of IEEE studies how to manage coexistence of a plurality of wireless networks different from each other. As a result of the studies related to such coexistence until now, there is realization of coexistence by a cooperative or uncooperative method in consideration of information exchange among a plurality of wireless networks. An object of such study is mainly a plurality of networks for primary users different from each other (also called legacy wireless networks). An example of coexistence of a plurality of legacy wireless networks different from one another is a network according to IEEE802.11 and a network according to IEEE802.15. Therefore, coexistence of a network including a secondary user with another network has not been sufficiently studied.

In the case of realizing coexistence of a plurality of networks for secondary users, it is necessary to consider another factor different from the coexistence of legacy wireless networks. Concretely, the following points have to be considered and it is not easy to realize the coexistence.

First, to realize the coexistence of a network for secondary users, interference to a network of a primary user has to be considered. Usually, each of the secondary users is constructed to access spectrum which is not temporarily used by the primary users. Consequently, a case such that a plurality of secondary users accesses the same spectrum may happen. When such a case happens, there is the possibility that interference also to the primary user occurs.

Second, even when the coexistence of networks for secondary users is realized, there is the possibility that a network for secondary users has to be reconstructed. A scheme of such a reconstruction has to be considered.

Third, it has to be considered to obtain (or access) information necessary to determine an access to the spectrum. For example, in a cognitive radio communication system, as information necessary to determine an access, there are two kinds of information; sensing information and regulatory information. However, according to non-patent literature 1, the regulatory information is stored in a place different from that of the sensing information. In the case where there is a plurality of pieces of information necessary to determine an access and the information is stored in respective databases, it is not easy to obtain the plurality of pieces of information.

CITATION LIST

Non-Patent Literature

Non-Patent Literature 1: "SECOND REPORT AND ORDER AND MEMORANDUM OPINION AND ORDER", FCC (Federal Communications Commission, U.S.A.), Literature Number FCC 08-260, Nov. 14, 2008

SUMMARY OF INVENTION

Technical Problem

An object of the present invention is to provide a wireless communication system and a wireless communication method capable of avoiding interference even when a network including a secondary user coexists. Another object of the present invention is to provide a coexistence manager installed in the system.

Solution to Problem

The present invention realizes, basically, coexistence of a plurality of networks by installing a coexistence manager (CM) in a conventional wireless communication system. At least a part of the present invention is planned to be disclosed in the following non-patent literatures A and B.

[Non-Patent Literature A] Chen Sun, et al., "Optimization of transmit Power and Time Slot for Multiple Secondary Users in Cognitive Radio System", Institute of Electronics, Information and Communication Engineers (IEICE), SR study group, Mar. 3, 2010

[Non-Patent Literature B] Chen Sun, et al., "Coexistence Manager of Heterogeneous TV WS Networks", Institute of Electronics, Information and Communication Engineers (IEICE), SR study group, Mar. 3, 2010

A first aspect of the present invention relates to a wireless communication system including a plurality of networks.

The wireless communication system includes a primary user belonging to a first network, a first secondary user belonging to a second network, and a coexistence manager (CM). The coexistence manager (CM) is installed so as to be able to communicate in the first and second networks. The coexistence manager (CM) includes acquiring means, determining means, and notifying means.

The acquiring means is means for acquiring information regarding spectrum holes which are not at least temporarily used by the primary user. The determining means is means for determining whether or not usage of the spectrum holes by the first secondary user causes interference in the first network. The notifying means is means, in the case where the determining means determines that interference occurs in the first network, for notifying a second secondary user belonging to a third network different from the second network, of the determination.

With the configuration, in the first network, coexistence of the second and third networks is realized. Concretely, a plurality of networks can coexist so as to avoid interference to at least the first network.

In a preferred aspect of the present invention, the coexistence manager (CM) further includes generating means and transmitting means. In the case where the determining means determines that interference occurs in the first network, the generating means acquires a coexistence rule for enabling coexistence of the second network from a predetermined database, and generates a control message necessary for the coexistence of the second network and a parameter and a rule necessary to reconstruct the second network from the coexistence rule obtained from the database. The predetermined database may be stored in a storage device provided for the coexistence manager (CM) or may be stored in another source. The transmitting means is means for transmitting the control message, the parameter, and the rule generated by the generating means to the first secondary user. With such a configuration, interference to the primary user can be reliably suppressed.

In a preferred aspect of the present invention, the coexistence manager (CM) further includes second determining means. The second determining means is means for determining whether or not usage of the spectrum holes by the first and second secondary users causes interference in the first network. In the case where the second determining means determines that interference occurs in the first network, the notifying means notifies both of the first and second secondary users of the determination. In such a manner, interference to the primary user can be reliably suppressed.

Further, in a more preferred aspect of the present invention, the coexistence manager (CM) includes second generating means and transmitting means. In the case where the second determining means determines that interference occurs in the first network, the second generating means acquires a coexistence rule for enabling coexistence of the second network from a predetermined database, and generates a control message necessary for the coexistence of the second and third networks and a parameter and a rule necessary to reconstruct at least one of the second and third networks from the coexistence rule acquired from the database. The predetermined database may be stored in a storage device provided for the coexistence manager (CM) or may be stored in another source. The coexistence manager (CM) uses a predetermined algorithm for generating the information. The transmitting means is means for transmitting the control message, the parameter, and the rule generated by the second generating means to a secondary user corresponding to at least one of the second and third networks. With the configuration, occurrence of interference can be suppressed more reliably.

Further, in a more preferred aspect of the present invention, the first and second secondary users use the spectrum holes in a time division manner. In this case, the second generating means of the coexistence manager (CM) includes allocating means which allocates time slots and transmission outputs of the first and second secondary users. In the case where the second determining means determines that interference occurs in the first network, the allocating means of the coexistence manager (CM) adjusts to increase a transmission Output value of the first secondary user so that the value of quality of coexistence (QoC) is maximized, and adjusts so that the time slot of the second secondary user becomes long. The value of quality of coexistence (QoS) indicates the ratio of interference to the primary users, of transmission quality of the first and second secondary users. The transmitting means transmits a transmission output value and the time slot allocated by the allocating means to the first and second secondary users. With the configuration, even when a plurality of networks coexists in the wireless communication system, the performance can be increased.

In a preferred aspect of the present invention, a second coexistence manager (CM) constructed in a manner similar to the above-described coexistence manager (CM) is installed in the third network. In this case, the coexistence manager (CM) and the second coexistence manger (CM) can exchange information. The notifying means of the coexistence manager (CM) notifies the second secondary users of occurrence of interference in the first network via the second coexistence manager (CM). In such a manner, a plurality of coexistence managers (CM) can cooperate.

In another preferred aspect of the present invention, a second coexistence manager (CM) is installed in the third network. In this case, the second coexistence manager (CM) performs determining process necessary for coexistence of the second and third networks on the basis of the information from the coexistence manager (CM). The second coexistence manager (CM) notifies the second secondary user of occurrence of interference in the first and second networks and controls wireless communication of the second secondary user. That is, the function of one coexistence manager (CM) can be dispersed to a plurality of coexistence managers (CM).

In a preferred aspect of the present invention, the wireless communication system further includes a database. The database stores information regarding the primary user and regulatory information for controlling wireless communication performed in the first network. The acquiring means of the coexistence manager (CM) accesses the database to acquire the information regarding the primary user and, on the basis of the acquired information regarding the primary user, acquires information regarding the spectrum holes. In such a manner, the use situation of the spectrum can be accurately grasped.

In another preferred aspect of the present invention, the wireless communication system further includes a database. The database stores information regarding the spectrum hole (sensing information) and regulatory information for controlling wireless communication performed in the first network. The acquiring means of the coexistence manager (CM) accesses the database to acquire the information regarding the spectrum hole. In such a manner, the spectrum use situation can be accurately grasped. Since information from the database can be directly used, the processing speed can be increased.

Further, in a more preferred aspect of the present invention, the acquiring means of the coexistence manager (CM)

accesses the database via a dedicated control channel in order to acquire the information regarding the primary user. With the configuration, the coexistence manager (CM) can be prevented from causing interference with the primary user.

In a preferred aspect of the present invention, the coexistence manager (CM) further includes registering means. The registering means registers information indicating that the second secondary user belonging to the third network uses the spectrum holes in the case where the determining means determines that no interference occurs in the first network. In such a manner, the second secondary user can reliably assures a state where no interference occurs in the first secondary user and the primary user.

A second aspect of the present invention relates to a coexistence manager (CM). The coexistence manager (CM) is similar to that installed in a wireless communication system including a first network and a second network in the above-described first aspect. Therefore, also by the aspect, effects equivalent to those obtained by the first aspect can be produced.

A third aspect of the present invention relates to a wireless communication method. The wireless communication method is for enabling coexistence, in a wireless communication system including a first network and a second network, of the second network and a third network. Therefore, also by the aspect, effects equivalent to those obtained by the first aspect can be produced.

Another aspect of the present invention relates to a program (algorithm) for realizing the wireless communication method and a recording medium which stores the program. Also by the aspects, effects equivalent to those of the first and third aspects can be produced.

Advantageous Effects of Invention

According to the present invention, in a wireless communication system, even when a network including secondary users coexists, interference can be avoided. By the present invention, a coexistence manager (CM) which can be provided for the wireless communication system, a corresponding wireless communication method, and the like can be provided.

DESCRIPTION OF EMBODIMENTS

Hereinafter, modes for carrying out the present invention will be described with reference to the drawings. However, the modes to be described are examples and can be properly modified within a range it is obvious for a person skilled in the art.

Figure 1:
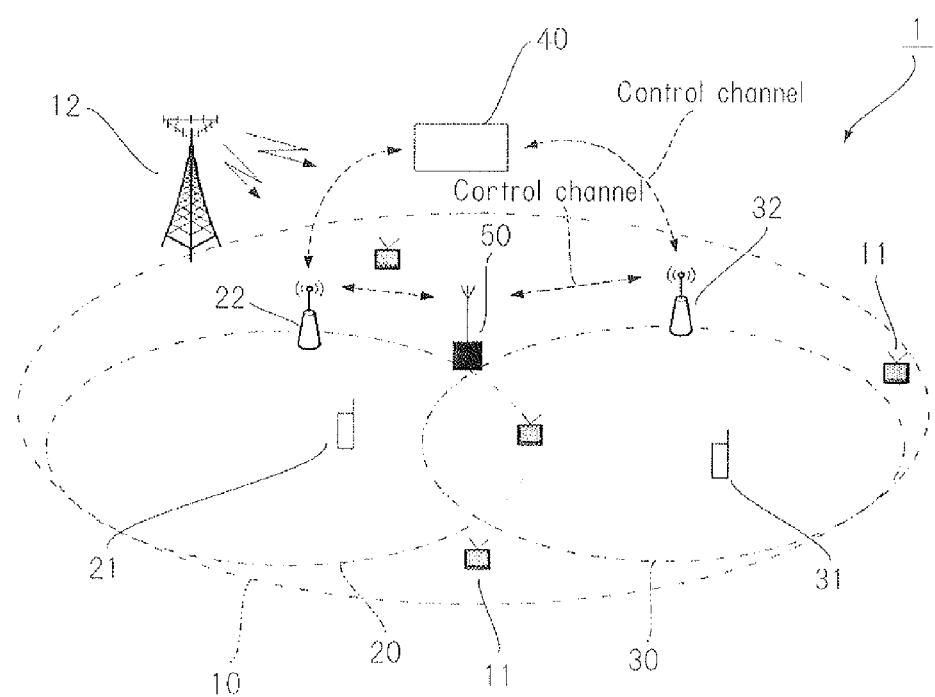
FIG. 1 is a block diagram schematically showing an example of the configuration of a cognitive radio communication system of the present invention.

FIG. 1 is a block diagram schematically showing an example of the configuration of a wireless communication system of the present invention.

A wireless communication system 1 shown in FIG. 1 is, for example, a cognitive wireless communication system and includes: a network 10 for primary users as a legacy wireless network; a network 20 for first secondary users (hereinbelow, also called first network 20); and a network 30 for second secondary users (hereinbelow, also called second network 30). The wireless communication system 1 is not limited to a cognitive wireless communication system but may be any system including a network which can be dynamically accessed.

To the network 10 for primary users, one or more primary users 11 belong. The primary user 11 may be any device as long as it can perform wireless communication and may be, for example, a device conformed to IEEE802.11 or IEEE802.15. An area in which the primary user 11 can perform communication in the network 10 for primary users is determined by a basestation 12.

To the network 20 for first secondary users, one or more first secondary users 21 belong. The first secondary user 21 may be any device as long as it can perform wireless communication but is, preferably, a device which can perform cognitive radio communication. An area in which the first secondary user 21 can perform communication in the network 20 for first secondary users is determined by a basestation 22.

To the network 30 for second secondary users, one or more second secondary users 31 belong. The second secondary user 31 may be any device as long as it can perform wireless communication but is, preferably, a device which can perform cognitive radio communication. An area in which the second secondary user 31 can perform communication in the network 30 for second secondary users is determined by a basestation 32.

The wireless communication system 1 further includes a database 40 and a coexistence manager (CM) 50.

The database 40 is provided to store information necessary to control wireless communication and disposed in a position which can be accessed by the basestations 12, 22, and 32 and the like. The database 40 may be a data archive (DA) which can perform communication. Preferably, the database 40 is a data archive specified by IEEE1900.6 or a regulatory repository specified by FCC. More preferably, the database 40 is a database (white space sensing database (WSD)) storing both sensing information (information on a white space) and regulatory information necessary to control the cognitive radio communication. Preferably, the database 40 stores information in a primitive and data format which can be interpreted by the coexistence manager (CM) 50. Preferably, the database 40 is disposed in a position which can be accessed also by the coexistence manager (CM) 50.

The coexistence manager (CM) 50 is a novel device for solving the above-described coexistence problem and is, concretely, a logical element. The coexistence manager (CM) is, in the example shown in FIG. 1, of a standalone type and installed in an arbitrary position in the wireless communication system 1. The coexistence manager (CM) 50 is not limited to the standalone type but may be mounted in the primary user 11 or the secondary users 21 and 31 or mounted in the basestations 12, 22, and 32. The coexistence manager (CM) 50 is installed in an area in which it can perform communication with the primary users 11 and the secondary users 21 and 32. In the embodiment, the coexistence manager (CM) can perform communication with the basestations 22 and 32 so that it can obtain information from the database 40 via the basestations 22 and 32. In the example shown in FIG. 1, the coexistence manager (CM) 50 is installed so that it can perform communication with both of the networks 20 and 30 for secondary users and perform central control. However, the installation of the coexistence manager (CM) is not limited to the above. For example, the coexistence managers (CM) may be installed so as to be distributed or dispersed to the networks. In this case, it is constructed that information can be exchanged among a plurality of coexistence managers (CM) (refer to FIGS. 3 and 4). The coexistence manager (CM) may not be installed to all of plurality of networks.

By installing the coexistence manager (CM) 50 in the wireless communication system 1, use of spectrum by a plurality of secondary users is managed so that interference among them can be avoided and interference to the primary users can be also avoided. To realize it, the coexistence manager (CM) 50 is constructed to have at least some of the following plurality of functions.

First, the coexistence manager (CM) 50 is constructed so as to be able to access the database 40. In the embodiment, the coexistence manager (CM) 50 accesses the database 40 via the basestation 22 or 32.

With the configuration, the coexistence manager (CM) 50 can obtain sensing information from the database 40. The sensing information includes information on a situation of use of the spectrum in a predetermined area. Particularly, in the embodiment, the sensing information includes information on the situation of use of the spectrum in a specific area in which a plurality of different networks of secondary users try to share radio environment. The coexistence manager (CM) 50 can obtain the sensing information from the database 40. The regulatory information includes, for example, information on unused frequencies or information on usable frequencies (for example, a list of usable channels).

Second, the coexistence manager (CM) 50 holds information regarding one or more primary users. The information regarding a primary user includes information regarding the spectrum use situation and information regarding an MAC. Preferably, the information regarding a primary user includes information regarding a geographical position of the primary user and information regarding a geographical position of a wireless receiver of the primary user. That is, the coexistence manager (CM) 50 preferably holds information regarding a geographical position of the primary user and information regarding a geographical position of the wireless receiver of the primary user. The coexistence manager (CM) 50 derives a requirement for the secondary user as a requirement to protect the primary user by using the information regarding the primary user.

Third, the coexistence manager (CM) 50 can hold information regarding networks for a plurality of secondary users (for example, the first and second networks 20 and 30). The information regarding the network for secondary users includes information regarding PHY of each network, information regarding the MAC, and information regarding the channel use situation. Preferably, the information regarding the network for secondary users includes information of a layer higher than the PHY layer and the MAC layer.

Fourth, the coexistence manager (CM) 50 can hold information regarding a usable channel (that is, spectrum opportunity). The information regarding a usable channel is, for example, information regarding a channel which is not presently used by the primary user and a channel which can be accessed by the secondary user. The information regarding a usable channel can be obtained from the sensing information from the database 40. The information regarding a usable channel can be obtained from the regulatory information from the database 40. According to the FCC, in the case where a device uses a white space for television, each device is requested to check a database and specify an accessible channel which is not used.

Fifth, the coexistence manager (CM) 50 can generate a coexistence rule (for example, policy information) and a parameter on the basis of the held information or in accordance with an algorithm. The parameter is information for urging the network of secondary users to execute reconstruction according to the parameter. For example, the coexistence manager (CM) 50 urges a secondary user to change transmission output, packet size, the channel use situation, or the like on the basis of channel information (for example, channel information such as RSSI). That is, the coexistence manager (CM) 50 can coordinate different networks for secondary users by using the information regarding the networks for secondary users. The existence rule is information for keeping the order of coexistence by being observed by the secondary users.

Concretely, in the case where interference occurs in a target network, the coexistence manager (CM) acquires the coexistence rule for enabling coexistence of the second networks from a predetermined database and, from the coexistence rule obtained from the database, generates a control message necessary for coexistence of the second and third networks and a parameter and a rule necessary to reconstruct at least one of the second and third networks. The predetermined database may be stored in a storage device provided for the coexistence manager (CM) 50 or may be stored in another source. The coexistence manager (CM) 50 transmits (provides) the generated information (the control message, the parameter, and the rule) to a corresponding secondary user. In the case where a plurality of networks is targets, the information generated by the coexistence manager (CM) 50 is provided to the secondary user belonging to at least one network. In such a manner, occurrence of interference can be suppressed more reliably.

Concretely, for the coordination, the coexistence manager (CM) 50 adjusts the parameters (for example, the transmission output, occupied frequency, data rate, and packet size) of a network for secondary users and newly sets a coexistence rule.

Preferably, the coexistence manager (CM) 50 defines a value as quality of coexistence (QoC), which is obtained by dividing a numerical value indicative of the transmission quality of a secondary user by the value of negative interference to the primary user and, using the value of coexistence quality as a criterion of performance at the time of coexistence, adjusts the parameter regarding allocation of the parameter regarding a transmission output and the time slot. In such a manner, the parameter can be adjusted after evaluating both of the spectrum use efficiency and the degree of interference to the primary user. The first and second secondary users use the spectrum holes in the allocated time slot (that is, in a time division manner). In such a manner, even when a plurality of networks coexists in the wireless communication system 1, the performance can be increased.

By constructing the coexistence manager (CM) 50 as described above, in the wireless communication system 1, management for avoiding interference in a plurality of secondary users is realized. Particularly, by the adjustment of the parameter, setting of the coexistence rule, and the like performed by the coexistence manager (CM) 50, optimization when a plurality of networks share the spectrum opportunity is performed, and the spectrum efficiency (that is, the performance of the wireless communication system 1) can be maximized.

Subsequently, network management process executed by the coexistence manager (CM) 50 will be described in detail with reference to FIG. 2. By the network management process, coexistence of a plurality of networks is managed.

Figure 2:
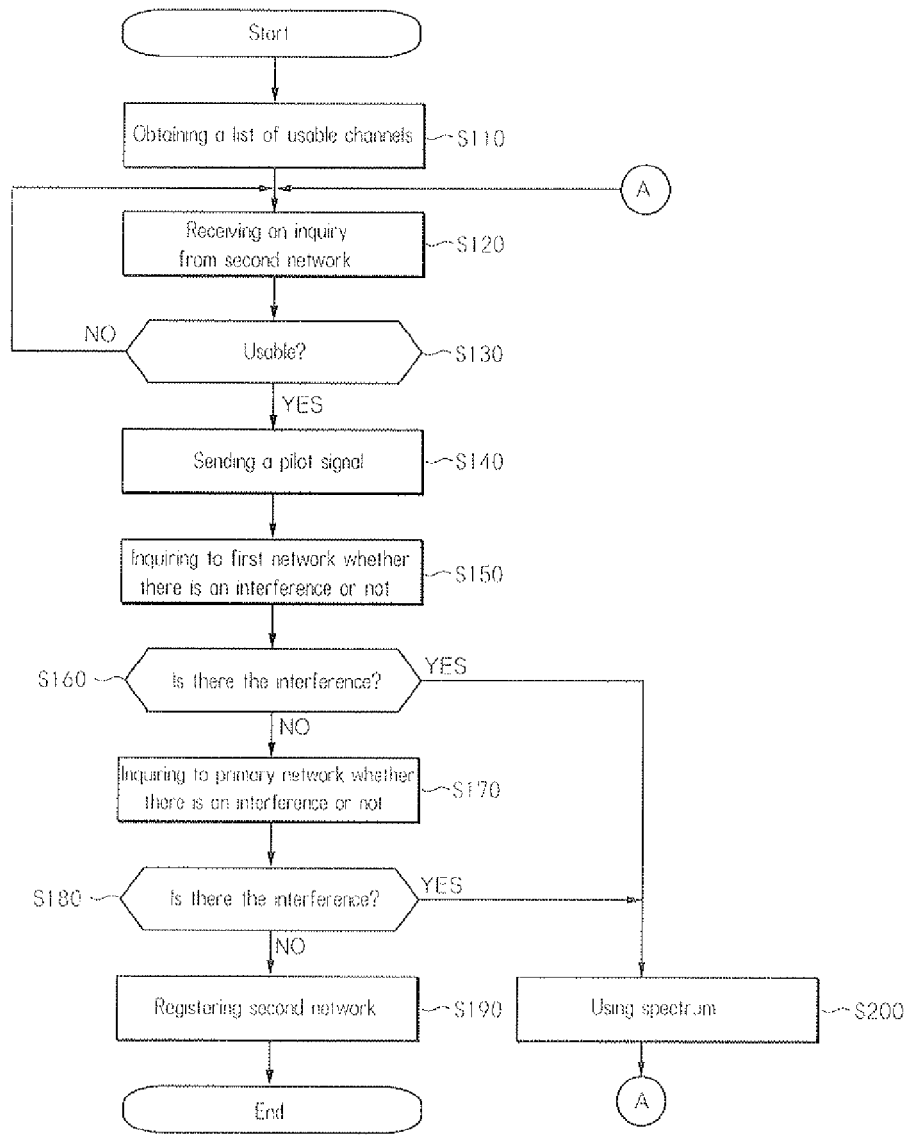
FIG. 2 is a flowchart showing the procedure of coexistence managing process executed by a coexistence manager (CM) in FIG. 1.

FIG. 2 is a flowchart showing the procedure of the network management process executed by the coexistence manager (CM) 50 in FIG. 1. The processes as shown in FIG. 2 are effective particularly, in the case where the network 20 for first secondary users starts using the specified spectrum opportunity (spectrum holes), when a coexistence state is generated due to the fact that the network 30 for second secondary users can access the same spectrum hole. The program (algorithm) corresponding to FIG. 2 is recorded in, for example, a recording medium. The program is read and executed by the coexistence manager (CM) 50, thereby performing the processes corresponding to FIG. 2.

In FIG. 2, first, in step S110, the coexistence manager (CM) 50 obtains a list of usable channels (spectrum opportunities) via a dedicated control channel as shown in FIG. 1. The dedicated control channel may be realized by a dedicated frequency or realized by using a specified spectrum opportunity.

The usable channel is a channel which is not temporarily used by the network 10 for primary users. The usable channel can be specified when the coexistence manager (CM) 50 accesses the database 40 to obtain the sensing information and/or regulatory information. Regarding the white space for television, a regulatory information database specified by the FCC holds information regarding a channel which is not used in a specific position. Consequently, the coexistence manager (CM) can recognize a usable channel on the basis of a geographical position of the network 10 for primary users. Similarly, the network 20 for first secondary users can also recognize the specified spectrum hole (the list of usable channels) and information regarding the use state of the spectrum hole.

In step S120, when the network 30 for second secondary users tries to use the spectrum hole in the case where the network 20 for first secondary users already starts using the spectrum hole, the network 30 for second secondary users inquires the coexistence manager (CM) 50 of a usable channel. That is, the coexistence manager (CM) 50 receives an inquiry for a usable channel from the network 30 for second secondary users.

In the case where there is a channel which is not used by the network 20 for first secondary users in a plurality of usable channels (YES in step S130), the network 30 for second secondary users transmits a beacon or test signal as a pilot signal (pilot tone) by using the channel (step S140).

Since the coexistence manager (CM) 50 already accesses the network 20 for first secondary users, the coexistence manager (CM) 50 can inquire the first secondary user 21. In step S150, the coexistence manager (CM) 50 inquires the network 20 for first secondary users. The inquiry relates to whether the network 30 for second secondary users detects (senses) interference or not when the network 20 for first secondary users sensed a beacon or test signal. In place of the inquiry, the coexistence manager (CM) 50 may check whether there is an interference alarm or not.

When the coexistence manager (CM) 50 receives a message that the network 20 for first secondary users receives interference in response to the inquiry (YES in step S160), the coexistence manager (CM) 50 proposes reconstruction of the networks 20 and 30 for secondary users (step S200). Such a proposal of reconstruction can be realized by transmitting a control message, a reconstruction parameter, and a rule to the networks 20 and 30 for secondary users from the coexistence manager (CM) 50.

In the case where the coexistence manager (CM) 50 receives the message indicative of no interference in the network 20 for first secondary users (NO in step S160), the coexistence manager (CM) 50 checks whether or not the two networks 20 and 30 coexisting in the same frequency band permit the possibility of occurrence of interference to the network 10 for primary users (step S170).

In the case where there is the possibility of interference (YES in step S170), the coexistence manager (CM) 50 proposes reconstruction on the basis of the parameters of the networks 20 and 30 for secondary users (step S200).

On the other hand, in the case where there is no possibility of interference (NO in step S170), the coexistence manager (CM) 50 can realize coexistence of the two networks 20 and 30 for secondary users. Concretely, the network 30 for second secondary users registers a frequency band (for example, the frequency band for white space for television) used by the network 30 in the coexistence manager (CM) 50 (step S190). After that, the process is finished.

In the case where the networks 20 and 30 for secondary users to which reconstruction is proposed in step S200 finish the reconstruction, the process returns to step S120, and the subsequent process is executed.

By the above-described process, in the case where a spectrum (that is, a spectrum opportunity or spectrum hole) which is not used by the network 10 for primary users is specified, the two networks 20 and 30 for secondary users can coexist in the specified spectrum hole. In other words, the coexistence manager (CM) 50 at least manages the coexistence of the networks 20 and 30 for secondary users, thereby functioning so as to protect the network 10 for primary users (that is, not to cause interference).

By the above-described process, the network 30 for second secondary users is managed so as not to cause interference in the network 20 for first secondary users. In such a manner, the coexistence of a plurality of networks can be performed reliably. Further, by the above-described process, in the case where there is the possibility that both of the first and second networks 20 and 30 use the spectrum, the coexistence manager (CM) 50 belonging to both of the networks recognizes the possibility of interference to the primary users. In the case where there is the possibility of interference, the coexistence manager (CM) 50 transmits information (control message, parameter, and rule) regarding proposal of reconstruction to devices belonging to the first and second networks 20 and 30. By the operation, interference to the primary users can be suppressed reliably.

The above-described process is just an example in which the coexistence manager (CM) 50 manages the networks 20 and 30 for secondary users. The above-described process can be applied to the case where a plurality of networks for secondary users exists. The coexistence manager (CM) 50 may be constructed so that it can use different algorithms (programs) or may be constructed so that it can realize the above-described process by using a plurality of algorithms (programs).

Subsequently, an embodiment of the present invention will be described.

The embodiment corresponds to the case of applying the radio technique to a rural area. In a rural area, an Internet access is supplied to each of houses in the rural area by an area network (RAN) of long distance. The internet access is made by, for example, using the white space for television via basestation and customer premises equipment (CPE).

Services on the Internet access described above can be realized by, for example, being complied with the white space for television (TV WS) standard of IEEE802.22.

On the other hand, in each of the houses, a wireless access is realized by a wireless local area network (WLAN), thereby forming an ad-hoc network using the white space for television.

Therefore, two kinds of wireless services use the same white space for television, and there is the possibility that interference occurs. In the case where interference occurs, the throughput of the two kinds of systems (networks) decreases. As a result, the user cannot be satisfied with the performance.

In the embodiment, the coexistence manager (CM) is installed as an independent device in a position where two kinds of radio services as described above exist. The coexistence manager (CM) may be provided in the access point of the WLAN or in the customer premises equipment (CPE).

The coexistence manager (CM) obtains information regarding the spectrum use situation, information regarding the service type, and information regarding the quality of service (QoS) from both of the wireless networks. The coexistence manager (CM) accesses the database to obtain information regarding the geographical positions of the secondary users, information regarding the geographical positions of the primary users, information regarding the propagation environment, and the like. The coexistence manager (CM) estimates a numerical value regarding interference of each network by using the obtained information, and transmits information of proposal of reconstruction to both of the networks. The reconstruction is performed by adjusting parameters such as the transmission output, modulation, data rate, and quality of service (QoS) on both of the networks. The adjustment has to be performed so that both of the networks can coexist in a state where they do not interfere each other. For this purpose, the coexistence manager (CM) sets a control message, a parameter, and a rule. In such a manner, the user can simultaneously receive the service from both of the networks.

In a scene that a wireless network (first network) is set up so as to use the white space for television, the present invention is effective to set up another network (second network) by using the same frequency band. In such a scene, first, the coexistence manager (CM) of the second network performs communication with the coexistence manager (CM) of the device belonging to the first network to obtain information regarding the spectrum use situation. Communication between the coexistence managers (CM) is realized by using a dedicated channel or employing a method using a beacon. Subsequently, the device belonging to the second network specifies spectrum which is not used and, using the specified spectrum, transmits a pilot signal. After that, in the case where interference in the first network is detected, each of the coexistence managers (CM) of the device belonging to the first network notifies the coexistence manager (CM) of the device belonging to the second network of the fact. On the other hand, in the case where no interference is detected, the coexistence manager (CM) belonging to both of the networks checks the database in which the information of the primary user (for example, the wireless receiver of a television) is stored.

Figure 3:
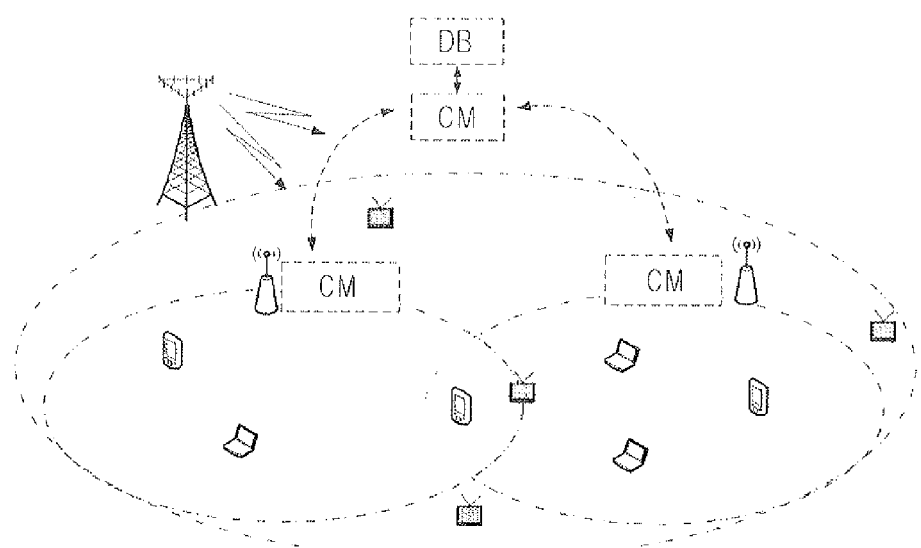
FIG. 3 is a block diagram schematically showing the configuration of another example of the wireless communication system illustrated in FIG. 1.
Figure 4:
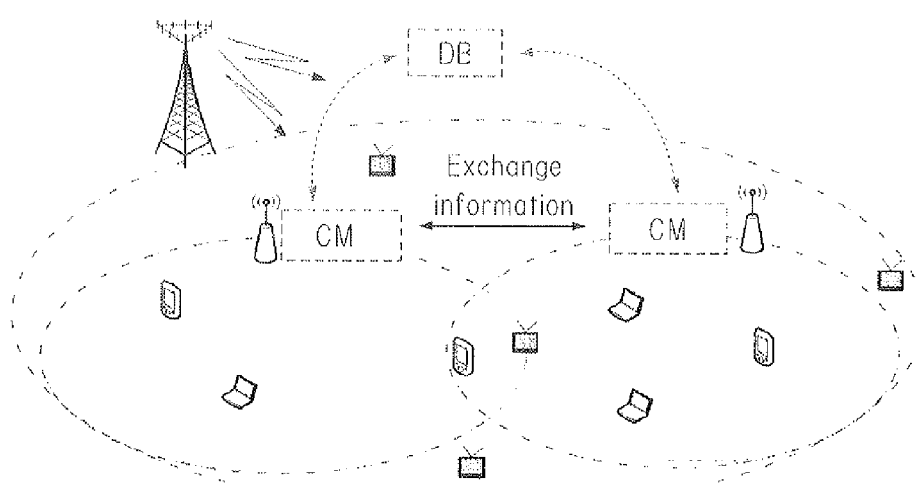
FIG. 4 is a block diagram schematically showing the configuration of further another example of the wireless communication system illustrated in FIG. 1.
Figure 5:
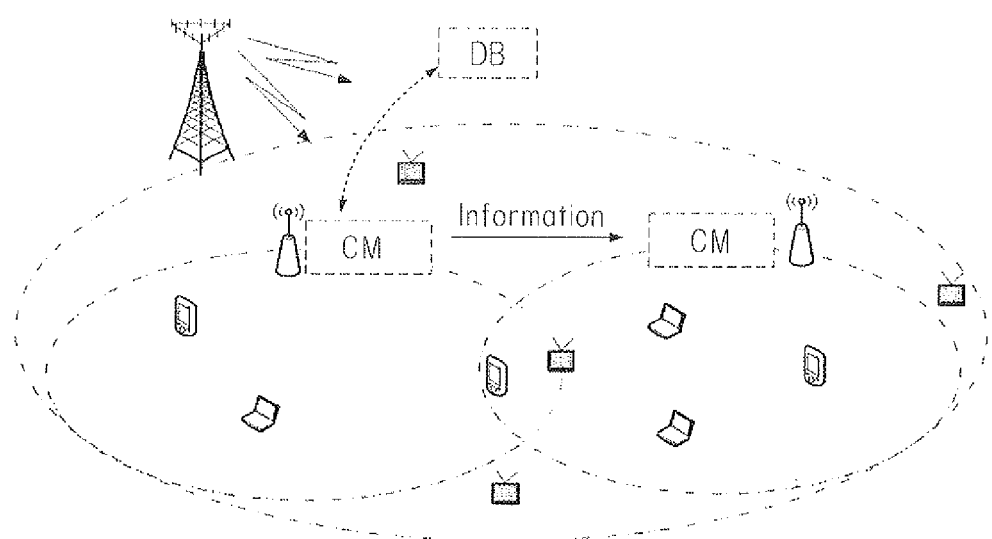
FIG. 5 is a block diagram schematically showing the configuration of further another example of the wireless communication system illustrated in FIG. 1.

In a preferred embodiment, the plurality of coexistence managers (CM) is installed so as to be dispersedly disposed in the wireless communication system. For example, the coexistence manager (CM) is installed in each of the wireless communication devices. With the configuration, all of the wireless communication devices have the function of the coexistence manager (CM). In another example, as shown in FIGS. 3 to 5, the coexistence manager (CM) may be provided in each of basestations (or access points) of the networks for secondary users. In the example shown in FIG. 3, the coexistence manager (CM) provides service of an access to a network for secondary users or devices belonging to the network, and transmits a command and a message. In the example shown in FIG. 4, two coexistence managers (CM) exchange information, thereby enabling each of the coexistence managers to perform determining process necessary for coexistence. In the example shown in FIG. 5, One of the existence managers (CM) collects information and sets a coexistence rule and supplies the information to the other coexistence manager (CM). The coexistence manager (CM) which receives the information performs determining process necessary for coexistence. According to the information determined by the determining process, each of the secondary users operates. As described above, a plurality of coexistence managers (CM) may have a plurality of functions of one coexistence manager (CM) in a dispersed manner. Therefore, the example shown in FIG. 5 is just an example, and the functions of the coexistence manager (CM) may be dispersed by another method.

Example

An example of the present invention will be described.

In the above-described mode, the coexistence manager (CM) can adjust the parameters and the like so that two networks for secondary users can coexist. In the example, with respect to the case where two secondary users use a spectrum hole in a time division manner, a simulation was made when a time slot is allocated to each of secondary users.

Figure 6:
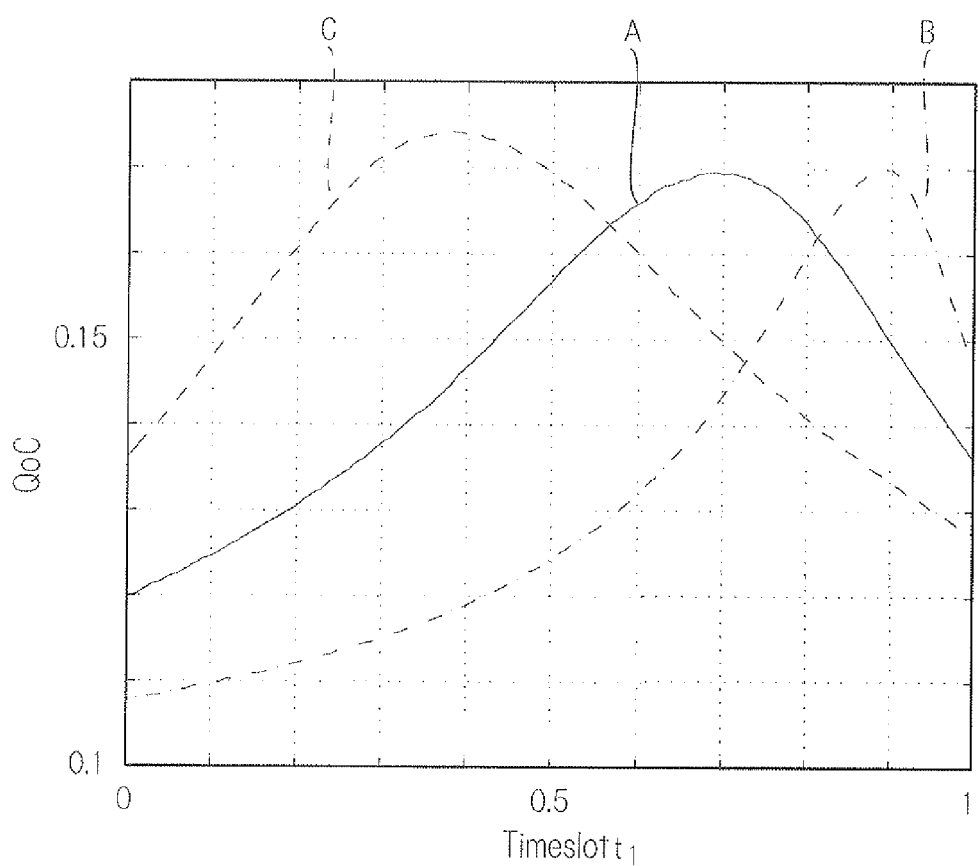
FIG. 6 is a graph showing a simulation result obtained in the embodiment of the present invention.

FIG. 6 is a graph showing a simulation result obtained in the example of the invention. The horizontal axis in FIG. 6 corresponds to a time slot $t_1$ allocated to one of the secondary users (first secondary user) when time using the spectrum hole is set to 1. It is sufficient to obtain a time slot $t_2$ allocated to the other secondary user (second secondary user) by subtracting $t_1$ from 1 (that is, $t_2=1-t_1$). The vertical axis in FIG. 6 shows the numerical value of the quality of coexistence (QoC). In FIG. 6, the curve A corresponds to the case where both of transmission outputs of the two secondary users are 1, the curve B corresponds to the case where the transmission output of the first secondary user is 0.5 and the transmission output of the other secondary user (second secondary user) is 1.5, and the curve C corresponds to the case where the transmission output of the first secondary user is 0.5 and the transmission output of the other secondary user (second secondary user) is 1.5.

It is understood from FIG. 6 that the value of the quality of coexistence (QoC) fluctuates depending on the allocated time slot and the transmission output. In a preferred mode of the present invention, therefore, the coexistence manager (CM) 50 adjusts the parameters regarding the transmission output and the parameters regarding allocation of the time slot by using the value of the quality of coexistence (QoC) as the criterion of determination of the performance at the time of coexistence. In a concrete example, the transmission output value of the first secondary user is adjusted so as to be increased and the time slot of the second secondary user is adjusted so as to be long so that the value of the quality of coexistence (QoC) is maximized. The sum of the transmission output value of the first secondary user and that of the second secondary user is constant. It is also possible to adjust the transmission output value of the second secondary user so as to be increased and adjust the time slot of the first secondary user so as to be long. In such a manner, after evaluating both of the spectrum use efficiency and the degree of interference to the primary user, the parameters and the like can be adjusted. The first and second secondary users use the spectrum hole in the allocated time slot (that is, in the time division manner). Thus, even when a plurality of networks coexists in the wireless communication system 1, the performance can be increased.

INDUSTRIAL APPLICABILITY

The present invention can be applied to the wireless communication system and the wireless communication method and can be also employed for industrial use.

REFERENCE SIGNS LIST

1 Wireless communication system
10 Network for primary users
11 Primary users
12 Basestation
20 Network for first secondary users
21 First secondary users
22 Basestation
30 Network for second secondary users
31 Second secondary users
32 Basestation
40 Database

The invention claimed is:

1. A wireless communication system including a first network and a second network, comprising:
a primary user belonging to the first network;
a first secondary user belonging to the second network; and
a coexistence manager (CM) installed so as to be able to communicate in the first network and the second network,
wherein the coexistence manager (CM) comprises:
acquiring means for acquiring information regarding spectrum holes which are not at least temporarily used by the primary user;
determining means for determining whether usage of the spectrum holes by the first secondary user causes interference in the first network or not; and
notifying means, when the determining means determines that interference occurs in the first network, for notifying a second secondary user belonging to a third network which is different from the second network that interference occurs in the first network,
thereby enabling the second network and the third network to coexist in the first network.

2. The wireless communication system according to claim 1, wherein the coexistence manager (CM) further comprises:
generating means, when the determining means determines that interference occurs in the first network,
for acquiring a coexistence rule for enabling coexistence of the second network from a predetermined database, and
for generating a control message necessary for the coexistence of the second network and generating a parameter and a rule necessary to reconstruct the second network from the coexistence rule obtained from the database; and
transmitting means for transmitting the control message, the parameter, and the rule generated by the generating means to the first secondary user.

3. The wireless communication system according to claim 1, wherein the coexistence manager (CM) further comprises second determining means for determining whether usage of the spectrum holes by the first and second secondary users causes interference in the first network or not,
wherein in the case where the second determining means determines that interference occurs in the first network, the notifying means notifies both of the first and second secondary users of the determination.

4. The wireless communication system according to claim 3, wherein the coexistence manager (CM) further comprises:
second generating means, when the second determining means determines that interference occurs in the first network,
for acquiring a coexistence rule for enabling coexistence of the second network from a predetermined database, and
for generating a control message necessary for the coexistence of the second and third networks and generating a parameter and a rule necessary to reconstruct at least one of the second and third networks from the coexistence rule acquired from the database; and
transmitting means for transmitting the control message, the parameter, and the rule generated by the second generating means to a secondary user corresponding to at least one of the second and third networks.

5. The wireless communication system according to claim 3, wherein the first and second secondary users use the spectrum holes in a time division manner,
the second generating means of the coexistence manager (CM) includes allocating means for allocating time slots and transmission outputs of the first and second secondary users,
when the second determining means determines that interference occurs in the first network, the allocating means of the coexistence manager (CM) adjusts to increase a transmission output value of the first secondary user so that the value of quality of coexistence (QoC) indicative of the ratio of interference to the primary users, of transmission quality of the first and second secondary users is maximized, and adjusts so that the time slot of the second secondary user becomes long, and
the transmitting means transmits a transmission output value and the time slot allocated by the allocating means to the first and second secondary users.

6. The wireless communication system according to claim 1, wherein a second coexistence manager (CM) constructed in a manner similar to the coexistence manager (CM) is installed in the third network,
the coexistence manager (CM) and the second coexistence manger (CM) can exchange information, and
the notifying means of the coexistence manager (CM) notifies the second secondary users of occurrence of interference in the first network via the second coexistence manager (CM).

7. The wireless communication system according to claim 1 wherein a second coexistence manager (CM) is installed in the third network, and
the second coexistence manager (CM) performs determining process necessary for coexistence of the second and third networks on the basis of the information from the coexistence manager (CM).

8. The wireless communication system according to claim 1, further comprising a database storing information regarding the primary user and regulatory information for controlling wireless communication performed in the first network,
wherein the acquiring means of the coexistence manager (CM) accesses the database to acquire the information regarding the primary user and, on the basis of the acquired information regarding the primary user, acquires information regarding the spectrum holes.

9. The wireless communication system according to claim 1, further comprising a database storing information regarding the spectrum hole and regulatory information for controlling wireless communication performed in the first network,
wherein the acquiring means of the coexistence manager (CM) accesses the database to acquire the information regarding the spectrum hole.

10. The wireless communication system according to claim 8,
wherein the acquiring means of the coexistence manager (CM) accesses the database via a dedicated control channel in order to acquire the information regarding the primary user.

11. The wireless communication system according to claim 1, wherein the coexistence manager (CM) further comprises registering means which registers information indicating that the second secondary user belonging to the third network uses the spectrum holes in the case where the determining means determines that no interference occurs in the first network.

12. A coexistence manager (CM) installed in a wireless communication system including a first network and a second network, wherein the coexistence manager (CM) comprises:
acquiring means, which is installed so that it can perform communication in the first and second networks, for acquiring information regarding spectrum holes which are not at least temporarily used by the primary user belonging to the first network;
determining means for determining whether usage of the spectrum holes by the first secondary user belonging to the second network causes interference in the first network or not; and
notifying means, when the determining means determines that interference occurs in the first network, for notifying a second secondary user belonging to a third network different from the second network that interference occurs in the first network,
thereby enabling the second network and the third network to coexist in the first network.

13. A wireless communication method for enabling coexistence, in a wireless communication system including a first network and a second network, of the second network and a third network,
the wireless communication system including:
a primary user belonging to the first network;
a first secondary user belonging to the second network; and
a coexistence manager (CM) installed so as to be able to communicate with the first and second networks,
the wireless communication method comprising:
an acquiring step of acquiring, by the coexistence manager (CM), information regarding spectrum holes which are not at least temporarily used by the primary user;
a determining step of determining, by the coexistence manager (CM), whether or not usage of the spectrum holes by the first secondary user causes interference in the first network; and
a notifying step, when it is determined in the determining step that interference occurs in the first network, of notifying, by the coexistence manager (CM), to a second secondary user belonging to a third network different from the second network that interference occurs in the first network.

14. The wireless communication system according to claim 9,
wherein the acquiring means of the coexistence manager (CM) accesses the database via a dedicated control channel in order to acquire the information regarding the primary user.

* * * * *